United States Patent
Tsuchiya et al.

[11] Patent Number: 5,929,613
[45] Date of Patent: Jul. 27, 1999

[54] REGULATOR FOR AN ALTERNATOR OF A VEHICLE

[75] Inventors: Masanori Tsuchiya, Hitachinaka; Naoyuki Takahashi, Mito; Keiichi Mashino, Hitachinaka, all of Japan

[73] Assignee: Hitachi, Ltd., Japan

[21] Appl. No.: 08/923,938

[22] Filed: Sep. 5, 1997

[30] Foreign Application Priority Data

Sep. 6, 1996 [JP] Japan .................. 8-236706

[51] Int. Cl.$^6$ .................................................. H02J 7/14
[52] U.S. Cl. .............................. 322/58; 322/28; 322/99
[58] Field of Search .......................... 322/20, 28, 36, 322/37, 58, 99

[56] References Cited

U.S. PATENT DOCUMENTS

| | | | |
|---|---|---|---|
| 3,852,653 | 12/1974 | Kuroda et al. | 320/64 |
| 4,470,004 | 9/1984 | Morishita et al. | 322/99 |
| 4,471,288 | 9/1984 | Morishita et al. | 322/99 |
| 4,739,245 | 4/1988 | Komurasaki et al. | 322/99 |
| 5,512,812 | 4/1996 | Ono | 322/28 |

*Primary Examiner*—Nestor Ramirez
*Assistant Examiner*—Nicholas Ponomarenko
*Attorney, Agent, or Firm*—Evenson, McKeown, Edwards & Lenahan P.L.L.C.

[57] ABSTRACT

A regulator for an alternator installed in a vehicle has a switching circuit in which a field current limiting transistor interruptibly controls a flow of current to a field coil of the alternator. A battery output voltage detection terminal is connected to the battery, and an alternator output voltage terminal is connected to the alternator. A diode connected to the battery output voltage detection terminal has a reverse recovery time of 20 ns–20 μs, and a resistor is connected between the diode and the alternator output voltage terminal. A control circuit controls the switching circuit, in order to regulate the voltage at a connection point of the diode and the resistor so as to keep the voltage constant, and an alarm generating circuit illuminates a charge indicator lamp if the voltage at a junction of said diode and said resistor exceeds a reference voltage.

16 Claims, 2 Drawing Sheets

REGULATOR FOR AN ALTERNATOR OF A VEHICLE

BACKGROUND AND SUMMARY OF THE INVENTION

The present invention relates to a regulator for an alternator installed in a vehicle.

In a regulator for an alternator installed in a vehicle, it is known to control the voltage of the alternator based on a detected output voltage of a battery provided at the vehicle. An alternator disclosed in U.S. Pat. No. 3,852,653, a battery output voltage detection terminal S is connected to an alternator output voltage terminal B via a diode and a resistor which are serially connected. Voltage detection is switched to the alternator output voltage terminal B if a wire connecting the battery to the battery output voltage detection terminal S is disconnected from the battery. Similarly, voltage detection is switched to the battery output voltage detection terminal S if a wire connecting the battery to the alternator output voltage terminal B is disconnected from the battery. Such a regulator can adequately control an alternator installed at a vehicle, since the battery output voltage can be detected even if a wire connecting the battery to the battery output voltage detection terminal S is disconnected, or a wire connecting the battery to the alternator output voltage terminal B is disconnected.

However, in the above-mentioned conventional regulator, since a battery output voltage detection terminal S and an alternator output voltage terminal B are connected via a diode and a resistor, the following problem can occur: If the battery output voltage detection terminal S is irradiated by radio frequency noise from radio equipment, the battery output voltage detection terminal S and the diode (of which an anode is connected to the terminal S) detect a high-frequency carrier wave of the radio waves, and the voltage V0 at the cathode of the diode increases. Further, it is also likely that the alternator will stop generating power or that a charging state display lamp will be wrongly turned on, due to the increase of the voltage V0, notwithstanding that the battery 6 is not fully charged.

SUMMARY OF THE INVENTION

An object of the present invention is to suppress any voltage increase caused by high frequency radio wave noise at a cathode of a diode connected between a battery output voltage detection terminal and an alternator output voltage terminal, and to prevent an erroneous interruption of the alternator operation and illumination of a charging state display lamp caused by such highfrequency radio wave noise.

This and other objects and advantages are achieved by the regulator according to the invention, which includes a switching arrangement for selectively enabling or interrupting a flow of electric current to a field coil of the alternator for charging a battery provided at the vehicle, a battery output voltage detection terminal connected to the battery, an alternator output voltage terminal connected to the alternator, a diode connected to the battery output voltage detection terminal, possessing a reverse recovery time of 20 ns–20 $\mu$s, a resistor connected between the diode and the alternator output voltage terminal, and a unit for controlling the switching arrangement, in order to regulate the voltage at a connection point of the diode and the resistor so as to keep the voltage constant.

Whenever a radio wave of 50 MHz impinges on the battery output voltage detection terminal, if the reverse recovery time of the diode is 20 ns–20 $\mu$s (which is much longer than the period corresponding to 50 MHz), the forward current flowing in the diode is almost equal to the reverse current flowing in the diode, so that the voltage at the connection point of the diode and the resistor changes very little. Therefore, it is possible to prevent the detected output voltage of the battery from changing due to the irradiation of a high frequency radio wave. According to another embodiment of the invention, the regulator for a vehicle alternator includes an alternator output voltage terminal connected to an alternator for charging a battery provided in the vehicle, a battery output voltage detection terminal connected to the battery, a diode connected to the battery output voltage detection terminal and having a reverse recovery time of 20 ns–20 $\mu$s, a resistor connected between the diode and the alternator output voltage terminal, and an alarm which is actuated if the voltage at a connection point of the diode and the resistor exceeds the predetermined voltage.

Since the reverse recovery time of the diode is 20 ns–20 $\mu$s (which is much longer than the period corresponding to a high frequency radio wave which impinges on the battery output voltage detection terminal), the voltage at the connection point of the diode and the resistor scarcely changes. Therefore, a false alarm does not occur even if a high frequency radio wave irradiates the battery output voltage detection terminal.

Moreover, such an alarm may also be included in the first embodiment described above, in which case it is possible to prevent the detected output voltage of the battery from changing due to irradiation by a high frequency radio wave, and in addition a wrong alarm due to the changes of the detected battery voltage does not occur, even if a high frequency radio wave irradiates the battery output voltage detection terminal.

In the regulator described above, it is preferable that the reverse recovery time of the diode is limited to a range of 1, $\mu$s–10, $\mu$s, which gives even greater assurance that changes of the battery output voltage and false alarms are prevented. According to still another embodiment of the present invention, a regulator for an alternator installed in a vehicle includes switching arrangement for selectively enabling or interrupting a flow of electric current to a field coil of the alternator for charging a battery provided at the vehicle, a battery output voltage detection terminal connected to the battery, an alternator output voltage terminal connected to the alternator, a diode connected to the battery output voltage detection terminal, a low-pass filter connected between the diode and the battery output voltage detection terminal, for removing a high frequency signal of more than 50 MHz, which irradiates and propagates from the battery output voltage detection terminal, a resistor connected between the diode and the alternator output voltage terminal, and a unit for controlling the switching arrangement, in order to regulate the voltage at a connection point of the diode and the resistor so as to keep the voltage constant.

The low-pass filter connected between the diode and the battery output voltage detection terminal removes high frequency signal components of more than 50 MHz, which propagate from the battery output voltage detection terminal. Thus, even if the battery output voltage detection terminal is irradiated by a radio wave of 50 MHz, the radio wave signal is prevented from propagating to the diode, and the voltage at the connection point of the diode and the resistor scarcely changes. Therefore, it becomes possible to prevent the alternator output voltage from changing due to irradiation by a high frequency radio wave.

The previous embodiment may also include an alarming means for generating an alarm if the voltage at a connection point of the diode and the resistor exceeds the predetermined voltage. By using the above-mentioned low-pass filter, even if a radio wave of 50 MHz irradiates the battery output voltage detection terminal, the radio wave is prevented from propagating to the diode, and the voltage at the connection point of the diode and the resistor scarcely changes. Therefore, it is possible to prevent the alternator output voltage from changing due to a high frequency radio wave, and a wrong alarm does not occur, even if a high frequency radio wave irradiates the battery output voltage detection terminal.

In still another embodiment of the present invention, a regulator for an alternator installed in a vehicle has an alternator output voltage terminal connected to an alternator for charging a battery provided in the vehicle, a battery output voltage detection terminal connected to the battery, a diode connected to the battery output voltage detection terminal, a low-pass filter connected between the diode and the battery output voltage detection terminal, for removing a high frequency signal of more than 50 MHz, which irradiates and propagates from the battery output voltage detection terminal, a resistor connected between the diode and the alternator output voltage terminal, and an alarm which is actuated if the voltage at a connection point of the diode and the resistor exceeds a predetermined voltage.

The low-pass filter connected between the diode and the battery output voltage detection terminal removes high frequency signal components of more than 50 MHz, which propagate from the battery output voltage detection terminal. Thus, even if the battery output voltage detection terminal is irradiated by a radio wave of 50 MHz, the radio wave signal is prevented from propagating to the diode, and the voltage at the connection point of the diode and the resistor scarcely changes. Therefore, a false alarm does not occur even if a high frequency radio wave irradiates the battery output voltage detection terminal.

Other objects, advantages and novel features of the present invention will become apparent from the following detailed description of the invention when considered in conjunction with the accompanying drawings.

DETAILED DESCRIPTION OF THE EMBODIMENTS

Hereinafter, details of the present invention will be explained with reference to embodiments shown in FIGS. 1–4.

Figure 1:
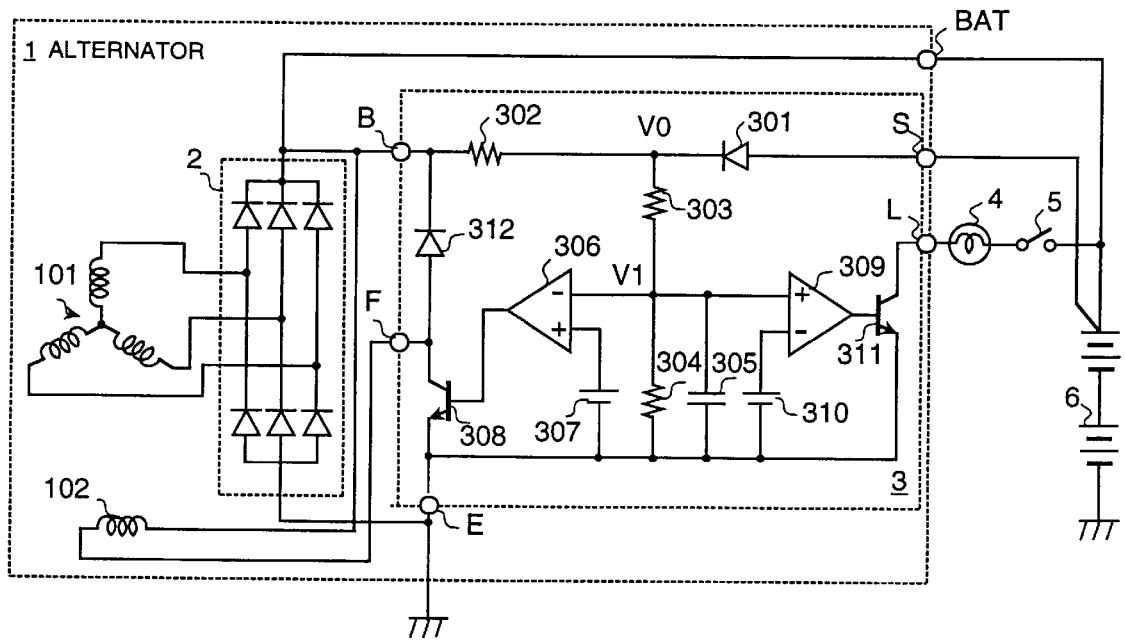
FIG. 1 is a circuit diagram of a regulator for an alternator installed in a vehicle according to a first embodiment of the present invention.

FIG. 1 shows a circuit diagram of a first embodiment of a regulator 3 for an alternator 1 installed in a vehicle, according to the present invention. A vehicle battery 6 is connected via a terminal BAT to a three-phase full wave rectifier 2, which in turn is connected to a stator coil 101 of the alternator 1.

The battery 6 is also connected to the anode of a diode 301 via a battery output voltage detection terminal S. The cathode of the diode 301 is connected to an alternator output voltage terminal B via a resistor 302 (resistance element). The alternator output voltage terminal B is connected to the three-phase full wave rectifier 2 and to a terminal F via the field coil 102. The terminal F is also connected to the anode of a fly-wheel diode 312, and the cathode of the diode 312 is connected to a junction point of the resistor 302 and the alternator output voltage terminal B. Further, the anode of the fly-wheel diode 312 is also connected to a terminal E via the collector and emitter of a field current limiting transistor 308 (switching means). The terminal E is also connected to the three-phase full wave rectifier 2, and to ground.

A junction point connecting the cathode of the diode 301 with the resistor 302 is connected to the emitter of the transistor 308 via resistors 303 and 304. Further, a junction point of the resistors 303 and 304 is connected to a negative input terminal of a comparator 306 for controlling on-off operation of the transistor 308 in order to keep a constant voltage at the junction point connecting the cathode of the diode 301 with the resistor 302. A positive input terminal of the comparator 306 is connected to a junction point of the resistor 304 and the emitter of the transistor 308 via a reference voltage source 307 used for regulating the output voltage of the battery 6. An output terminal of the comparator 306 is connected to the base of the transistor 308.

Further, the junction point of the resistors 303 and 304 is connected to a positive input terminal of a comparator 309. The negative input terminal of the comparator 309 is connected to the emitter of transistor 311 for driving a charge indicator lamp via a reference voltage source 310 used for monitoring the output voltage of the battery 6. A junction point between the emitter of the transistor 311 and the reference voltage source 310 is connected to the junction point between the emitter of the transistor 308 with the resistor 304. The positive input terminal of the comparator 309 is connected to the junction point connecting the emitter of the transistor 311 with the reference voltage source 310 via a capacitor 305.

Further, an output terminal of the comparator 309 is connected to a base of the transistor 311. A collector of the transistor 311 is connected to the battery 6 via a terminal L, a charge indicator lamp 4 (alarming means) and a key switch 5.

The regulator 3 has the terminals S, B, F, E and L, the diodes 301 and 312, the resistors 302, 303 and 304, the comparators 306 and 309, the voltage sources 307 and 310, the transistors 308 and 311, and the capacitor 305.

A voltage V1 obtained by dividing the battery output voltage via the resistors 303 and 304 is compared with the reference voltage 307 in the comparator 306, and the conducting or non-conducting state of the field current limiting transistor 308 is controlled by the output signal of the comparator 306. Further, the voltage V1 is compared with the output of the reference voltage source 310 used for monitoring the battery output voltage by the comparator 309. If the voltage V1 exceeds the output of the reference voltage source 310, the transistor 311 for driving a charge indicator lamp is driven to a conducting state, and the charge indicator lamp 4 is turned on.

Figure 2:
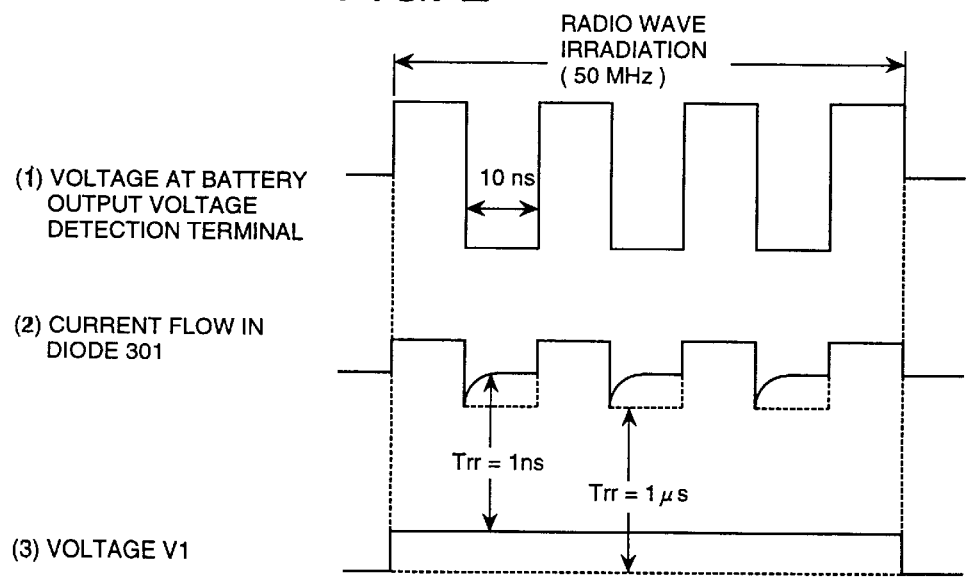
FIG. 2 shows a voltage waveform at a voltage detection output when a radio wave of 50 MHz irradiates battery output voltage detection terminal S.

In the above-mentioned regulator 3 for an alternator installed at a vehicle, if the battery output voltage detection terminal S is irradiated by a radio wave of 50 MHz, the voltage at the battery output voltage detection terminal S shows a voltage waveform in which the radio wave of 50 MHz is superimposed on the battery output voltage, which is shown by the top waveform (a) in FIG. 2.

In the above case, if a generally used diode possessing the reverse recovery time Trr of about 1 ns is used as the diode 301, current hardly flows in the reverse direction of the diode 301, as shown by a solid line of the middle waveform (b) in FIG. 2. Consequently, the voltage V1 at the function point of the resistor 303 and the resistor 304 increases in comparison with the voltage V1 in the absence of such irradiation of the radio wave of 50 MHz (shown by a broken line), which is shown by a solid line in the bottom waveform (c) of FIG. 2.

Thus, if the voltage V1 exceeds the output of the reference voltage source 307, the field current limiting transistor 308 is erroneously driven to the non-conducting state by the comparator 306. Moreover, if the voltage V1 exceeds the output of the reference voltage source 310, the transistor 311 is driven to the conducting state by the comparator 309, and the charge indicator lamp 4 is erroneously turned on.

On the other hand, if the diode 301 has a reverse recovery time Trr of about 1 μs, much longer than the period corresponding to the radio wave of 50 MHz, the current flowing in the diode 301 has a waveform which closely approximates the broken line in graph (b) of FIG. 2. That is, in the diode 301, the forward current is almost equal to the reverse current, and the voltage V1 scarcely changes as shown by the broken line of graph (c) of FIG. 2, even if a high frequency radio wave is irradiated on the battery output voltage detection terminal S. Therefore, this embodiment of a regulator according to the invention can prevent an incorrect control of the alternator or the incorrect illumination of the charge indicator lamp 4 due to the spurious changes of the voltage V1.

Figure 3:
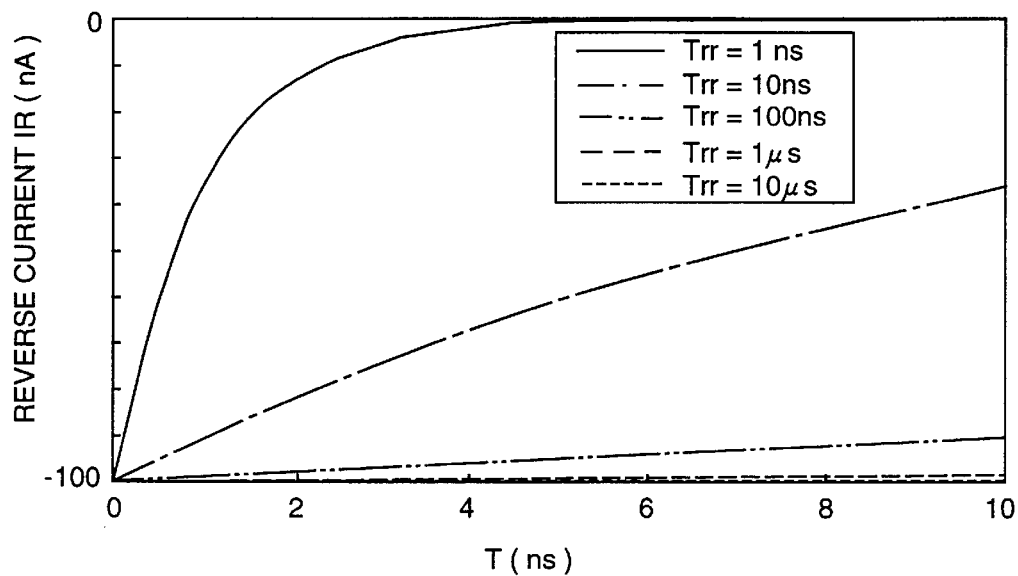
FIG. 3 shows the relationship between reverse current flowing in respective diodes possessing various reverse recovery times and periods of radio waves which irradiate battery output voltage detection terminal S.

FIG. 3 shows the relationship between reverse current IR flowing in respective diodes possessing various reverse recovery times Trr and periods T of radio waves which irradiate battery output voltage detection terminal S. It should be noted in connection with this graph that the frequency of the radio wave radiation f (MHz) is related to the period T by the following equation: T=1/f.

As shown in FIG. 3, in a diode having a reverse recovery time Trr>>T (that is, 1/f), a sufficient inverse current flows. Preferably, in the first embodiment the diode 301 has a reverse recovery time Trr in the range: 1 μs≦Trr≦10 μs. However, for radio waves of 50 MHz, a reverse recovery time of 20 ns–20 μs is sufficiently effective to permit a large reverse current IR to flow. If the diode 301 possesses the reverse recovery time Trr in the above-mentioned range, the first embodiment is applicable.

As mentioned above, by using a diode possessing the reverse recovery time Trr sufficiently longer than the period T reverse to the frequency of a radio wave which irradiates the battery output voltage detection terminal S, it is possible to prevent incorrect control of the alternator or incorrect illumination of the charge indicator lamp 4 due to detection of the spurious increases of the battery output voltage.

In order to reduce the reverse recovery time of a diode, a method of doping precious metal into the diode is generally adopted. On the contrary, however, for the purpose of the invention, the longer the reverse recovery time is, the more effectively a wrong control can be prevented. Therefore, the production cost of the regulator does not increase in the present invention.

Thus, the first embodiment of the present invention realizes a regulator of the low production cost, which can prevent the detection of a spurious increase in the battery output voltage caused by and high frequency noises such as a radio wave radiated from radio equipment high frequency noises occurring at the diode connected between the generator output voltage terminal and the battery output voltage detection terminal. It can also prevent incorrect control of the alternator or a wrong turning on of the charge indicator lamp.

Further, the first embodiment of the present invention is easily implemented when a regulator which lacks a battery output voltage detection terminal S is modified by adding a battery output voltage detection terminal S and connecting a diode and a resistor between the newly added battery output voltage detection terminal S and a generator output voltage detection terminal B.

Figure 4:
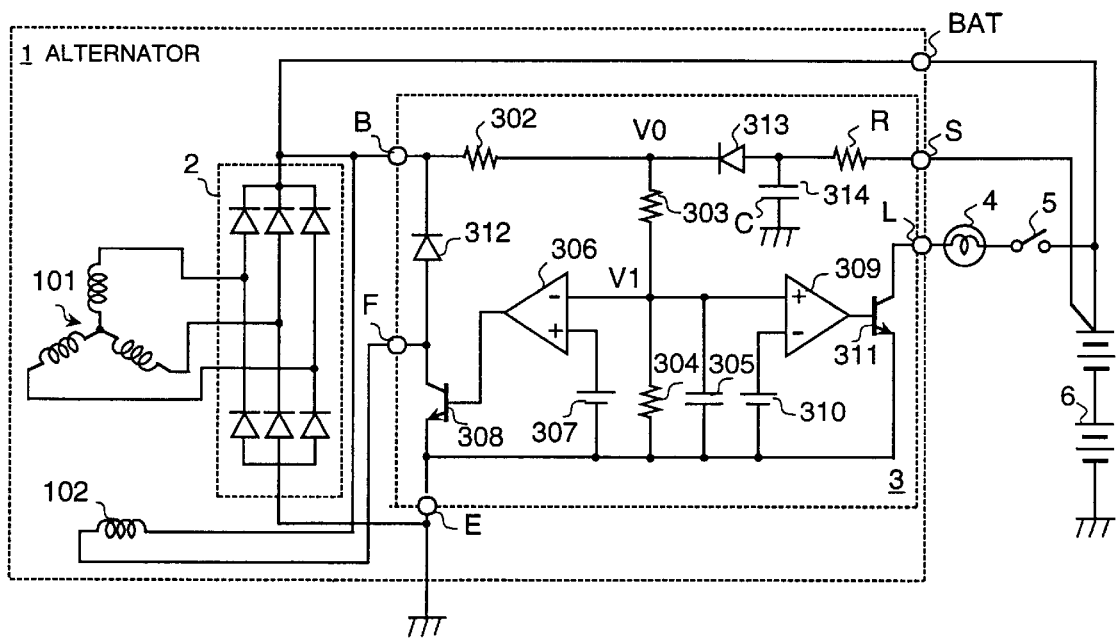
FIG. 4 shows a circuit diagram of a regulator for an alternator installed in a vehicle, according to a second embodiment of the present invention.

Another embodiment of the present invention is shown FIG. 4, in which the same numerals are used to denote the same parts as those shown in FIG. 1. The difference between the first embodiment and the second embodiment is that, in the second embodiment, a diode 313 having reverse recovery time Trr, for example, of less than 20 ns, is provided in place of the diode 301 in the first embodiment, and a low-pass filter 314 composed of a resistor R and a capacitor C is newly provided between the anode of the diode 313 and the battery output voltage detection terminal. Otherwise, composition is the same as that of the first embodiment.

The low-pass filter 314 is designed so that the values of the resister R and the capacitor C are such as to cut off high frequency radio wave of more than 50 MHz. Therefore, also in the second embodiment, even if a radio wave,of more than 50 MHz irradiates the battery output voltage detection terminal S, the increase of the voltage V1 due to the short reverse recovery time Trr of the diode 313 does not occur.

Therefore, the second embodiment of the present invention provides a regulator which can prevent the detection of a spurious increase in the battery output voltage, caused by high frequency noises such as radio waves radiated from radio equipment, or which occur at the diode connected between the generator output voltage terminal and the battery output voltage detection terminal. It can also prevent incorrect control of the alternator or incorrect illumination of the charge indicator lamp.

Although it is shown above that the filter 314 is composed of the resistor R and the capacitor C in the second embodiment, it is of course not restricted to such a filter. An EMC filter, a chip inductor, etc. can also be used, for example, to compose the filter 314.

As explained herein, a regulator for an alternator installed at a vehicle, according to the present invention has low production cost, can prevent the detection of a spurious increase in the battery output voltage caused by high frequency noises such as a radio wave radiated from radio equipment, or occurring at the diode connected between the generator output voltage terminal and the battery output voltage detection terminal. It can also a incorrect control of the alternator or incorrect illumination of the charge indicator lamp.

We claim:

1. A regulator for controlling an output of an electrical alternator, said regulator comprising:
    a switching device having a current flow path connected to interruptibly supply a flow of current to a field coil of said alternator for charging a battery;
    a battery output voltage detection terminal for connection to said battery;
    an alternator output voltage terminal for connection to said alternator;

a diode connected to said battery output voltage detection terminal, said diode having a reverse recovery time which is in a range of 20 ns–20 μs; and a resistor connected between said diode and said alternator output voltage terminal;

wherein said switching device, regulates a voltage at a junction point of said diode and said resistor so as to keep said voltage constant.

2. A regulator for controlling an output of an electrical alternator, according to claim 1 wherein said alternator and said battery are installed in a vehicle.

3. A regulator according to claim 1, further including an alarm which is activated if a voltage at a junction point of said diode and said resistor exceeds a predetermined voltage.

4. A regulator according to claim 1, wherein a reverse recovery time of said diode is within a range of 1 μs–10 μs.

5. A regulator for controlling an output of an electrical alternator for charging a battery, said regulator comprising:

an alternator output voltage terminal for connection to said alternator for charging a battery;

a battery output voltage detection terminal for connection to said battery;

a diode connected to said battery output voltage detection terminal, said diode having a reverse recovery time which is in a range of 20 ns–20 μs;

a resistor connected between said diode and said alternator output voltage terminal; and an alarm which is activated if a voltage at a junction point of said diode and said resistor exceeds a predetermined voltage.

6. A regulator for controlling an output of an electrical it alternator, according to claim 5 wherein said alternator and said battery are installed in a vehicle.

7. A regulator for controlling an output of an electrical alternator, said regulator comprising:

a switching device having a current flow path connected to interruptibly supply a flow of current to a field coil of said alternator for charging a battery;

a battery output voltage detection terminal for connection to said battery;

an alternator output voltage terminal for connection to said alternator;

a diode connected to said battery output voltage detection terminal;

a low-pass filter connected between said diode and said battery output voltage detection terminal, for removing a high frequency signal of more than 50 MHz, which impinges on and propagates from the battery output voltage detection terminal; and a resistor connected between said diode and said alternator output voltage terminal;

wherein said switching device, regulates a voltage at a junction point of said diode and said resistor so as to keep said voltage constant.

8. A regulator for controlling an output of an electrical alternator for charging a battery according to claim 7, wherein said alternator and said battery are installed in a vehicle.

9. A apparatus according to claim 7, further including an alarm which is activated if a voltage at a junction point of said diode and said resistor exceeds a predetermined voltage.

10. A regulator for controlling an output of an electrical alternator, said regulator comprising:

an alternator output voltage terminal connected to an alternator for charging a battery;

a battery output voltage detection terminal for connection to said battery;

a diode connected to said battery output voltage detection terminal;

a low-pass filter connected between said diode and said battery output voltage detection terminal, for removing a high frequency signal of more than 50 MHz, which impinges on and propagates from said battery output voltage detection terminal;

a resistor connected between said diode and said alternator output voltage terminal; and an alarm which is activated if a voltage at a junction of said diode and said resistor exceeds a predetermined voltage.

11. A regulator for controlling an output of an electrical alternator for charging a battery according to claim 10, said alternator and said battery are installed in a vehicle.

12. A regulator for controlling an output of an electrical alternator for charging a battery, said regulator comprising:

a battery output voltage detection terminal for connection to said battery;

a switching circuit having a current flow path connected to interruptibly supply a flow of current to an exciting coil of said alternator;

a control circuit connected to control on/off operation of said switching circuit as a function of a battery output voltage of said battery; and a diode connected between said battery output voltage detection terminal and an input of said control circuit;

wherein said diode has a reverse recovery time which is within a range of 20 ns–20 μs.

13. A regulator for controlling an output of an electrical alternator for charging a battery, according to claim 12, wherein said diode has a reverse recovery time which is within a range of 1 μ–10 μs.

14. A regulator for controlling an output of an electrical alternator for charging a battery, according to claim 12, wherein said control circuit is a comparator which compares a voltage detected at said battery output voltage detection terminal, and a predetermined reference value.

15. A regulator for controlling an output of an electrical generator unit for charging a battery according to claim 13, wherein said diode has a reverse recovery time which is in a range of 1 μs–10 μs.

16. A regulator for controlling an output of an electrical generator unit for charging a battery, said regulator comprising:

a control circuit having a current flow path for interruptibly controlling a flow of exciting current to said electrical generator unit, as a function of an output voltage of said battery; and a diode connected to supply a voltage signal to said control circuit, which voltage signal is indicative of a value of said output voltage of said battery;

wherein said diode has a reverse recovery time which is in a range of 20 ns–20 μs.

* * * * *